United States Patent
Nayak et al.

(10) Patent No.: US 10,645,000 B1
(45) Date of Patent: May 5, 2020

(54) APPARATUS, SYSTEM, AND METHOD FOR IMPROVING CONVERGENCE ACROSS VIRTUAL CONTROL AND FORWARDING PLANES WITHIN NETWORK DEVICES

(71) Applicant: Juniper Networks, Inc., Sunnyvale, CA (US)

(72) Inventors: Manoj Nayak, Bangalore (IN); Tabrez Ahmed Khan, Bangalore (IN); Rafik Puttur, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 62 days.

(21) Appl. No.: 15/996,517

(22) Filed: Jun. 3, 2018

(51) Int. Cl.
 H04L 12/721 (2013.01)
 H04L 12/715 (2013.01)
(52) U.S. Cl.
 CPC .................... *H04L 45/64* (2013.01)
(58) Field of Classification Search
 CPC ........................................ H04L 45/64
 See application file for complete search history.

(56) References Cited

U.S. PATENT DOCUMENTS

| 7,801,155 B2 | 9/2010 | Wang | |
|---|---|---|---|
| 2017/0026274 A1* | 1/2017 | Wang | .................. H04L 12/6418 |
| 2019/0166042 A1* | 5/2019 | Hu | .......................... H04L 45/34 |

OTHER PUBLICATIONS

Manoj Nayak, et al.; Apparatus, System, and Method for Dynamically Scaling Memory for Virtual Routers; U.S. Appl. No. 15/925,703, filed Mar. 19, 2018.

\* cited by examiner

*Primary Examiner* — Melvin C Marcelo
(74) *Attorney, Agent, or Firm* — FisherBroyles, LLP

(57) ABSTRACT

A disclosed method may include (1) identifying a first virtual forwarding plane of a physical network device that connects to a virtual control plane of the physical network device, (2) obtaining, by the first virtual forwarding plane, a set of data objects from the virtual control plane of the network device, (3) identifying a second virtual forwarding plane of the physical network device that connects to the first virtual forwarding plane of the physical network device, and then (4) providing, by the first virtual forwarding plane, at least a portion of the set of data objects to the second virtual forwarding plane via a shared memory segment that is accessible to both the first virtual forwarding plane and the second virtual forwarding plane. Various other systems and methods are also disclosed.

20 Claims, 7 Drawing Sheets

APPARATUS, SYSTEM, AND METHOD FOR IMPROVING CONVERGENCE ACROSS VIRTUAL CONTROL AND FORWARDING PLANES WITHIN NETWORK DEVICES

BACKGROUND

Network devices (such as routers and switches) are often used to forward traffic within a network and/or across networks. These network devices may be available to users in many forms. For example, routers may be offered as physical devices and/or virtual solutions. In the physical form, a router may include a memory device whose memory capacity remains fixed and/or invariable due to the physical nature of the device itself. In the virtual form, a router may be provisioned a memory allocation of an underlying physical host device.

Network devices often include a control plane and a forwarding plane. For example, a virtual router may include a control plane that determines how to handle incoming traffic. The virtual router's control plane may store networking objects that define paths from the virtual router to various destinations within a network. In this example, the virtual router may also include a forwarding plane that moves incoming traffic from an ingress interface to an egress interface. Like the virtual router's control plane, the virtual router's forwarding plane may store networking objects that define paths from the virtual router to various destinations within the network.

In a traditional configuration, the control plane may distribute many, if not all, of the networking objects to each physical device that corresponds to the forwarding plane. Unfortunately, this mass distribution of networking objects may be inefficient, resource-intensive, and/or unnecessary. For example, the virtual router may include a routing engine that corresponds to the control plane and a forwarding engine that corresponds to the forwarding plane. The forwarding engine may consist of multiple Flexible Physical Interface Card Concentrators (FPCs).

In one example, each networking object stored in the routing engine may apply to only one of the FPCs in the forwarding engine. Despite the limited applicability of the networking objects, the routing engine may still distribute all the networking objects to each FPC in the forwarding engine, thereby leading to unnecessarily long convergence times. As a result, the FPCs may end up storing networking objects that do not even apply to them, thereby leading to inefficient use of the FPCs' memory. Moreover, the FPCs may necessitate superfluous memory capacities to facilitate storing these inapplicable networking objects, thereby leading to increased memory costs.

The instant disclosure, therefore, identifies and addresses a need for additional and improved apparatuses, systems, and methods for improving convergence across virtual control and forwarding planes within network devices.

SUMMARY

As will be described in greater detail below, the instant disclosure generally relates to systems and methods for improving convergence across virtual control and forwarding planes within network devices. In one example, a method for accomplishing such a task may include (1) identifying a first virtual forwarding plane of a physical network device that connects to a virtual control plane of the physical network device, (2) obtaining, by the first virtual forwarding plane, a set of data objects from the virtual control plane of the network device, (3) identifying a second virtual forwarding plane of the physical network device that connects to the first virtual forwarding plane of the physical network device, and then (4) providing, by the first virtual forwarding plane, at least a portion of the set of data objects to the second virtual forwarding plane via a shared memory segment that is accessible to both the first virtual forwarding plane and the second virtual forwarding plane.

Similarly, an apparatus that implements the above-described method may include (1) a routing engine that (A) deploys a virtual control plane of a network device and (B) stores a set of data objects in connection with the virtual control plane, (2) a first FPC that (A) deploys a first portion of a virtual forwarding plane of the network device and (B) obtains the set of data objects from the routing engine in connection with the virtual forwarding plane, and (3) a second FPC that (A) deploys a second portion of the virtual forwarding plane of the network device and (B) obtains, in connection with the virtual forwarding plane, at least a portion of the set of data objects from the first FPC via a shared memory segment that is accessible to both the first FPC and the second FPC.

Additionally or alternatively, a network device that implements the above-described method may include (1) a routing engine that (A) deploys a virtual control plane of a network device and (B) stores a set of data objects in connection with the virtual control plane, (2) a first FPC that (A) deploys a first portion of a virtual forwarding plane of the network device and (B) obtains the set of data objects from the routing engine in connection with the virtual forwarding plane, and (3) a second FPC that (A) deploys a second portion of the virtual forwarding plane of the network device and (B) obtains, in connection with the virtual forwarding plane, at least a portion of the set of data objects from the first FPC via a shared memory segment that is accessible to both the first FPC and the second FPC.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
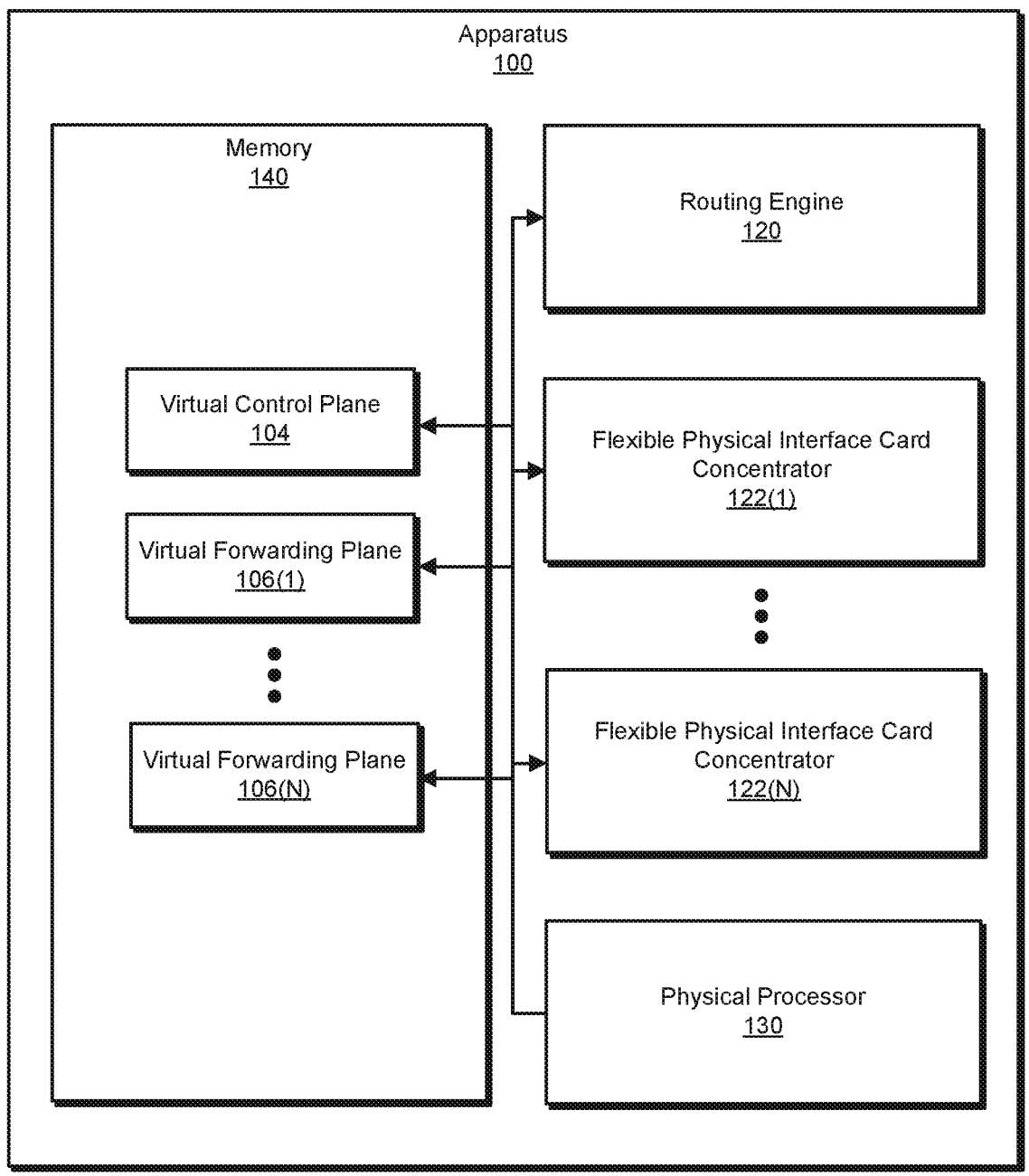
FIG. 1 is a block diagram of an exemplary apparatus for improving convergence across virtual control and forwarding planes within network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for improving convergence across virtual control and forwarding planes within network devices. As will be explained in greater detail below, embodiments of the instant disclosure may reduce the amount of time needed to distribute and/or install applicable data objects across physical components that correspond to the forwarding plane within network devices. Additionally or alternatively, embodiments of the instant disclosure may improve the storage efficiency of those physical components corresponding to the forwarding plane by reducing the amount of memory needed to store applicable data objects in connection with the forwarding plane, thereby potentially leading to lower memory costs for such network devices.

The term "convergence" and the phrase "to converge," as used herein, generally refer to the process of updating one database to match, correspond to, and/or coincide with another database. In some examples, a virtual control plane and a virtual forwarding plane may converge with one another with respect to a set of data objects. For example, a virtual control plane may include and/or correspond to a set of data objects stored in a routing table of a virtual router, and a virtual forwarding plane may include and/or correspond to a set of data objects stored in a forwarding table of the virtual router. In this example, the virtual control plane and the virtual forwarding plane may converge with one another such that the set of data objects stored in the forwarding table match and/or coincide with the set of data objects stored in the routing table.

In one example, the virtual forwarding plane may represent and/or be distributed across multiple hardware components within a forwarding engine. For example, the virtual forwarding plane may include and/or correspond to a set of data objects stored in memory across 4 different FPCs included in the forwarding engine. In this example, the virtual control plane may include and/or correspond to a set of data objects stored in memory on a routing engine. The virtual control plane and the virtual forwarding plane may achieve and/or reach convergence with one another when the set of data objects stored in memory on the routing engine match the set of data objects stored in memory across the 4 FPCs included in the forwarding engine.

The following will provide, with reference to FIGS. 1, 2, and 4-6, detailed descriptions of exemplary apparatuses, systems, and corresponding implementations for improving convergence across virtual control and forwarding planes within network devices. Detailed descriptions of corresponding computer-implemented methods will be provided in connection with FIG. 3. In addition, detailed descriptions of an exemplary computing system for carrying out these methods will be provided in connection with FIG. 7.

FIG. 1 is a block diagram of an exemplary apparatus 100 for improving convergence across virtual control and forwarding planes within network devices. As illustrated in this figure, exemplary apparatus 100 may include one or more routing and/or forwarding planes that store and/or include data objects that facilitate forwarding traffic within a network and/or across networks. For example, exemplary apparatus 100 may include a virtual control plane 104 and/or virtual forwarding planes 106(1)-(N) in FIG. 1.

In certain embodiments, virtual control plane 104 may include and/or represent a routing table and/or a Routing Information Base (RIB) that stores various data objects. In such embodiments, virtual control plane 104 may be stored, maintained, and/or located within user space on a physical device. For example, virtual control plane 104 may be executed by and/or deployed in a physical routing engine of a network device. Additionally or alternatively, virtual control plane 104 may be incorporated into, allocated to, and/or represent part of a virtual router.

In certain embodiments, virtual forwarding planes 106(1)-(N) may each include and/or represent a forwarding table and/or Forwarding Information Base (FIB) that stores various data objects. In such embodiments, virtual forwarding plane 106(1)-(N) may each operate and/or be executed by or deployed in a physical forwarding engine of a network device. In one example, the forwarding engine may include and/or represent a set of FPCs installed in the network device. Virtual forwarding planes 106(1)-(N) may represent separate and/or individual portions of a single forwarding plane executed by and/or deployed in the forwarding engine.

Examples of data objects stored in virtual control planes 104 and/or virtual forwarding planes 106(1)-(N) include, without limitation, data representations of and/or references to physical devices or interfaces (such an "ifd" objects), logical devices or interfaces (such as an "ifl" objects), next hops, and/or routes (such as IPv4 or IPv6 routes). Additional examples of such data objects include, without limitation, functions, variables, data structures, primitive types, records, route tables, forwarding tables, buffers, host cache entries, memory addresses, network addresses, variations or combinations of one or more of the same, and/or any other suitable data objects.

Upon completion of convergence, many, if not all, of the data objects stored in virtual control plane 104 may also be stored in one of virtual forwarding planes 106(1)-(N). However, in some cases, virtual control plane 104 may store and/or include certain data objects that are not applicable to virtual forwarding planes 106(1)-(N) for one reason or another. As a result, those inapplicable data objects may be excluded, omitted, and/or missing from all virtual forwarding planes 106(1)-(N) even after convergence.

As illustrated in FIG. 1, apparatus 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of virtual control plane 104 and virtual forwarding planes 106(1)-(N). Examples of memory 140 include, without limitation, Random Access Memory (RAM), Read Only Memory (ROM), flash memory, Hard Disk Drives, (HDDs), Solid-State Drives (SSDs), optical disk drives, caches, heap memory, distributed memory devices and/or solutions, variations or combinations of one or more of the same, and/or any other suitable storage memory.

As illustrated in FIG. 1, apparatus 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of virtual control plane 104 and virtual forwarding planes 106(1)-(N) stored in memory 140. Additionally or alternatively, physical processor 130 may execute and/or deploy one or more of virtual control plane 104 and virtual forwarding planes 106(1)-(N). Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary apparatus 100 may also include one or more routing engines, such as routing engine 120. In some examples, routing engine 120 may include and/or represent one or more physical devices and/or components tasked with routing network traffic among various paths within a network and/or across networks. In one example, virtual control plane 104 may operate and/or be executed by or deployed in routing engine 120.

In addition, exemplary apparatus 100 may also include one or more forwarding engines (not explicitly labelled in FIG. 1). In some examples, such forwarding engines may include and/or represent one or more physical devices and/or components tasked with forwarding network traffic within a network and/or across networks. In one example, virtual forwarding planes 106(1)-(N) may operate and/or be executed by or deployed in FPCs 122(1)-(N), respectively. In this example, FPCs 122(1)-(N) may include one or more Physical Interface Cards (PICs) that forward network traffic as packets. In other words, such PICs may be installed and/or inserted into each of FPCs 122(1)-(N).

Figure 2:
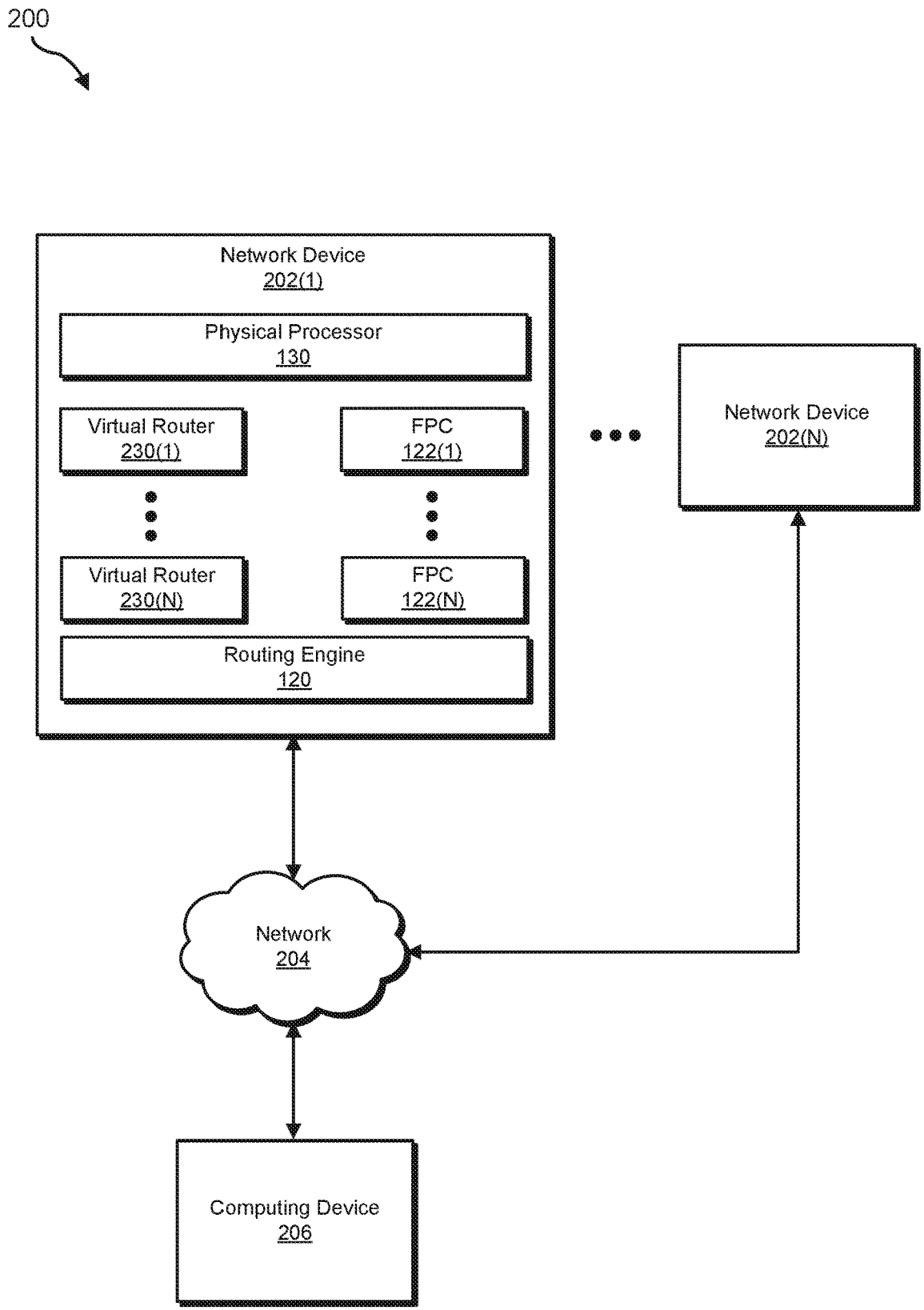
FIG. 2 is a block diagram of an exemplary implementation of an apparatus for improving convergence across virtual control and forwarding planes within network devices.

Exemplary apparatus 100 in FIG. 1 may be implemented in a variety of ways. For example, all or a portion of exemplary apparatus 100 may represent portions of exemplary implementation 200 in FIG. 2. As shown in FIG. 2, exemplary implementation 200 may include one or more network devices 202(1)-(N) and a computing device 206 in communication with one another via a network 204. In one example, all or a portion of the functionality of virtual control plane 104 and virtual forwarding planes 106(1)-(N) may be performed by network devices 202(1)-(N), computing device 206, and/or any other suitable computing system (whether or not explicitly illustrated in FIG. 2). As will be described in greater detail below, one or more of virtual control plane 104 and virtual forwarding planes 106(1)-(N) from FIG. 1 may, when executed by at least one physical processor of network device 202(1) or 202(N), enable network device 202(1) or 202(N) to improve convergence across virtual control and forwarding planes within network devices.

For example, and as will be described in greater detail below, one or more of routing engine 120 and FPCs 122(1)-(N) may execute and/or spin up one or more virtual routers 230(1)-(N) and/or improve convergence of virtual control and forwarding planes within a network device by (1) identifying virtual forwarding plane 106(1) that connects to virtual control plane 104, (2) obtaining, by virtual forwarding plane 106(1), a set of data objects from virtual control plane 104, (3) identifying virtual forwarding plane 106(N) that connects to virtual forwarding plane 106(1), and then (4) providing, by virtual forwarding plane 106(1), at least a portion of the set of data objects to virtual forwarding plane 106(N) via a shared memory segment that is accessible to both virtual forwarding plane 106(1) and virtual forwarding plane 106(N).

Network devices 202(1)-(N) each generally represent any type or form of physical computing device that forwards traffic within a network and/or across networks and/or hosts a virtual router. In one example, one or more of network devices 202(1)-(N) may include and/or represent a router, such as a Customer Edge (CE) router, a Provider Edge (PE) router, a hub router, a spoke router, an Autonomous System (AS) boundary router, and/or an area border router. Additional examples of network devices 202(1)-(N) include, without limitation, switches, hubs, modems, bridges, repeaters, gateways, network racks and/or chassis, servers, computers, laptops, desktops, portions of one or more of the same, combinations or variations of one or more of the same, and/or any other suitable network devices.

Computing device 206 generally represents any type or form of physical computing device capable of reading computer-executable instructions and/or communicating with other devices. In one example, computing device 206 may include and/or represent a client device, server, and/or router. Additional examples of computing device 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, network devices, variations or combinations of one or more of the same, and/or any other suitable computing devices. Although illustrated as a single entity in FIG. 2, computing device 206 may include and/or represent a plurality of devices that work and/or operate in conjunction with one another.

Network 204 generally represents any medium or architecture capable of facilitating communication or data transfer. In one example, network 204 may facilitate communication among network devices 202(1)-(N) and computing device 206. In this example, network 204 may facilitate communication or data transfer using wireless and/or wired connections. Examples of network 204 include, without limitation, an intranet, a Wide Area Network (WAN), a Local Area Network (LAN), a Virtual LAN (VLAN), a Personal Area Network (PAN), the Internet, Power Line Communications (PLC), a cellular network (e.g., a Global System for Mobile Communications (GSM) network), a virtual network, portions of one or more of the same, variations or combinations of one or more of the same, and/or any other suitable network. Although network devices 202(1)-(N) and computing device 206 are illustrated as being external to network 204 in FIG. 2, these devices may alternatively represent part of and/or be included in network 204.

Virtual routers 230(1)-(N) each generally represent a virtual machine that is hosted by a physical machine and forwards network traffic. In some examples, virtual routers 230(1)-(N) may each run on and/or be executed or hosted by a physical router. In such examples, virtual routers 230(1)-(N) may each route, service, and/or forward traffic on behalf of and/or in connection with a network consumer (such as an Internet Service Provider (ISP), a telecommunications provider, a media service, etc.). Accordingly, virtual routers 230(1)-(N) may provide and/or offer many, if not all, of the routing and/or forwarding services provided and/or offered by a traditional physical router. Virtual routers 230(1)-(N) may each include and/or provide an instance of virtual control plane 104 and/or instances of virtual forwarding planes 106(1)-(N).

Figure 3:
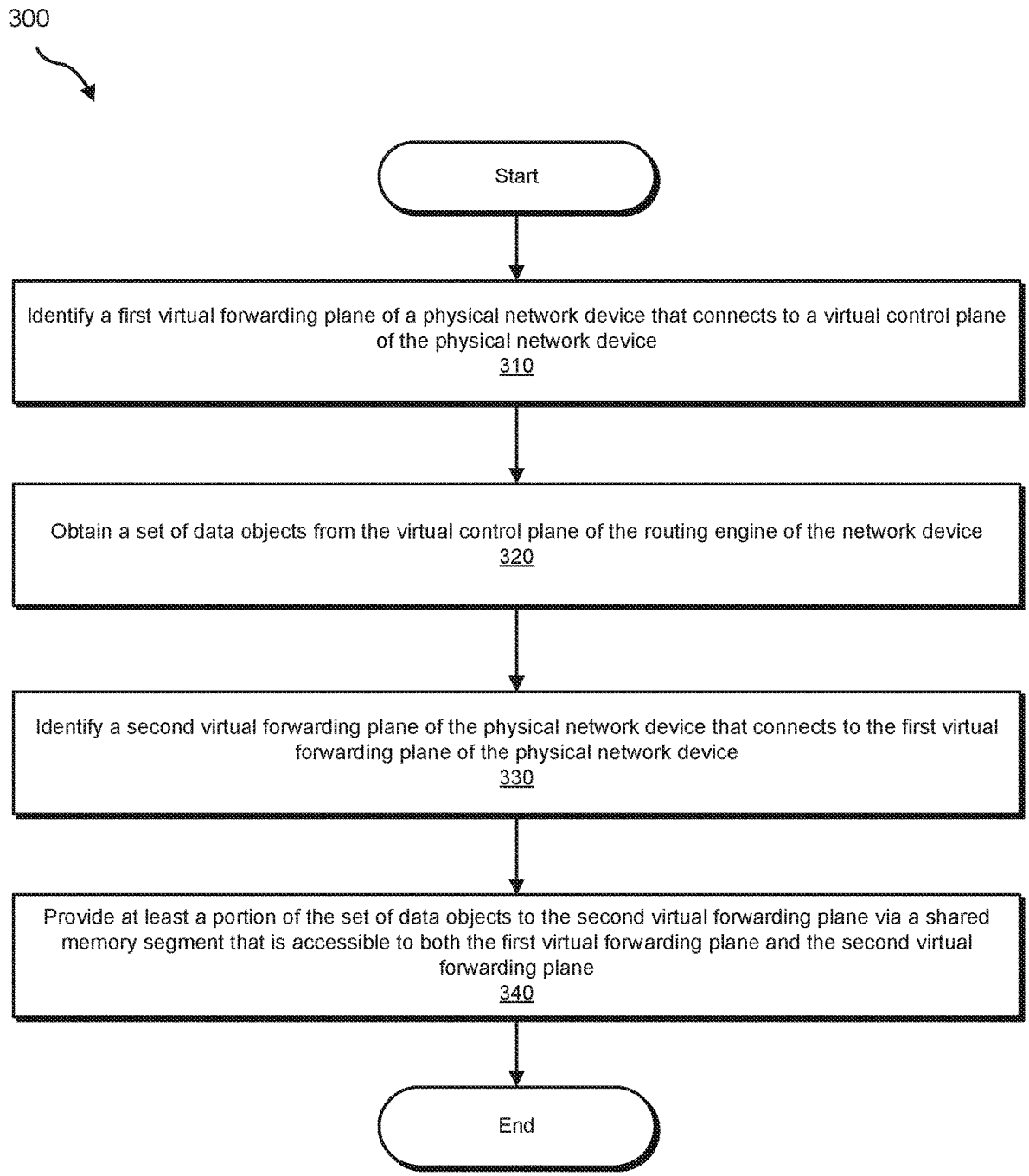
FIG. 3 is a flow diagram of an exemplary method for improving convergence across virtual control and forwarding planes within network devices.

FIG. 3 is a flow diagram of an exemplary computer-implemented method 300 for improving convergence across virtual control and forwarding planes within network devices. The steps shown in FIG. 3 may be performed by any suitable computer-executable code, computing system, and/or ASIC, including apparatus 100 in FIG. 1, network device 202(1) in FIGS. 2 and 4-6, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a first virtual forwarding plane of a physical network device that connects to a virtual control plane of the physical network device. For example, network device 202(1) may identify virtual forwarding plane 106(1) that connects to virtual control plane 104. In this example, virtual control plane 104 and virtual forwarding plane 106(1) may be connected via a network communication protocol, such as Transmission Control Protocol (TCP) and/or the Internet Protocol (IP).

The systems described herein may perform step 310 in a variety of different ways and/or contexts. In some examples, network device 202(1) may identify virtual forwarding plane 106(1) as the corresponding virtual router is executed and/or spun up. In other examples, network device 202(1) may identify virtual forwarding plane 106(1) as the virtual router updates certain routes in the forwarding engine, installs new routes into the forwarding engine, and/or performs convergence across the virtual control and forwarding planes of network device 202(1).

Returning to FIG. 3, at step 320 one or more of the systems described herein may obtain a set of data objects from the virtual control plane of the network device. For example, virtual forwarding plane 106(1) may, as part of network device 202(1), obtain a set of data objects from virtual control plane 104 via TCP/IP. In this example, the set of data objects may include and/or represent routes that define paths that lead to other devices within network 204.

The systems described herein may perform step 320 in a variety of different ways and/or contexts. In some examples, virtual forwarding plane 106(1) may request and/or solicit the set of data objects from virtual control plane 104. For example, the forwarding engine and/or FPC 122(1) may begin the process of convergence by requesting and/or soliciting the set of data objects from routing engine 120. In response to this request and/or solicitation, the routing engine 120 may distribute and/or provide the set of data objects to the forwarding engine and/or FPC 122(1).

In other examples, the set of data objects may arrive at and/or reach FPC 122(1) without any request and/or solicitation from FPC 122(1). For example, routing engine 120 may begin the process of convergence by distributing and/or providing the set of data objects to the forwarding engine and/or FPC 122(1). Accordingly, irrespective of whether routing engine 120 or the forwarding engine initiates convergence, the forwarding engine may propagate the set of data objects across FPC 122(1)-(N), starting with FPC 122(1). In other words, and as will be described in greater detail below, convergence may involve installing the entire set of data objects at FPC 122(1) and then distributing applicable data objects from the set throughout the remaining FPCs included in the forwarding engine.

Returning to FIG. 3, at step 330 one or more of the systems described herein may identify a second virtual forwarding plane of the physical network device that connects to the first virtual forwarding plane of the physical network device. For example, network device 202(1) may identify virtual forwarding plane 106(N) that connects to virtual forwarding plane 106(1). In this example, virtual forwarding plane 106(N) may be able to access virtual forwarding plane 106(1) by way of a shared memory segment. In one embodiment, this shared memory segment may include and/or represent Dynamic Random Access Memory (DRAM) and/or heap memory.

The systems described herein may perform step 330 in a variety of different ways and/or contexts. In some examples, network device 202(1) may identify virtual forwarding plane 106(N) as the corresponding virtual router is executed and/or spun up. In other examples, network device 202(1) may identify virtual forwarding plane 106(N) as the virtual router updates certain routes in the forwarding engine, installs new routes into the forwarding engine, and/or performs convergence across the virtual control and forwarding planes of network device 202(1).

Returning to FIG. 3, at step 340 one or more of the systems described herein may provide at least a portion of the set of data objects to the second virtual forwarding plane via a shared memory segment that is accessible to both the first virtual forwarding plane and the second virtual forwarding plane. For example, virtual forwarding plane 106(1) may, as part of network device 202(1), provide at least a portion of the set of data objects to virtual forwarding plane 106(N) via the shared memory segment accessible to both virtual forwarding plane 106(1) and virtual forwarding plane 106(N). This portion of the set may represent and/or consist of a subset of data objects that do not apply and/or correspond to virtual forwarding plane 106(1).

The systems described herein may perform step 340 in a variety of different ways and/or contexts. In some examples, virtual forwarding plane 106(N) may request and/or solicit the subset of data objects from virtual forwarding plane 106(1). For example, the forwarding engine and/or FPC 122(N) may continue the process of convergence by requesting and/or soliciting the subset of data objects from FPC 122(1). In response to this request and/or solicitation, FPC 122(1) may distribute and/or provide the subset of data objects to FPC 122(N). In this example, the subset of data objects provided to FPC 122(N) may be limited to those data objects that do not apply and/or correspond to FPC 122(1). Accordingly, the data objects that apply and/or correspond to FPC 122(1) may remain at and/or stay with FPC 122(1).

In other examples, the subset of data objects may arrive at and/or reach FPC 122(N) without any request and/or solicitation by FPC 122(N). For example, FPC 122(1) may continue the process of convergence by distributing and/or providing the subset of data objects to FPC 122(N).

In some examples, after having obtained the subset of data objects from virtual forwarding plane 106(1), virtual forwarding plane 106(N) may request certain data objects from virtual control plane 104 to ensure full convergence has been achieved. In one example, virtual forwarding plane 106(N) may obtain one or more additional data objects from virtual control plane 104 via TCP/IP. In this example, at least one of these additional data objects may represent and/or amount to a new data object that was excluded from the subset of data objects previously obtained from virtual forwarding plane 106(1).

Additionally or alternatively, virtual forwarding plane 106(N) may also determine that at least one of these additional data objects was previously obtained from virtual forwarding plane 106(1) via the shared memory segment. Accordingly, this additional data object may essentially represent and/or amount to a duplicate. In response to the determination that the additional data object was previously obtained from virtual forwarding plane 106(1), virtual forwarding plane 106(N) may drop the duplicate.

In some examples, the forwarding engine may mark certain data objects to indicate their corresponding forwarding planes. For example, FPC 122(1) may process the set of data objects at virtual forwarding plane 106(1). During this processing of the set of data objects, FPC 122(1) may identify some of the data objects as belonging and/or corresponding to virtual forwarding plane 106(1). FPC 122(1) may then mark those data objects (in, e.g., metadata) to indicate that they belong and/or correspond to virtual forwarding plane 106(1).

In one example, FPC 122(1) may identify certain data objects other than those belonging and/or corresponding to virtual forwarding plane 106(1). FPC 122(1) may or may not mark those other data objects (in, e.g., metadata) to indicate that they do not belong and/or correspond to virtual forwarding plane 106(1). FPC 122(1) may then provide those other data objects to virtual forwarding plane 106(N) by installing and/or distributing them to FPC 122(N). Additionally or alternatively, FPC 122(N) may obtain those other data objects from FPC 122(1) and then install the same into virtual forwarding plane 106(N).

In some examples, FPC 122(N) may obtain a copy of one or more data objects that belong and/or correspond to virtual forwarding plane 106(1). In one example, FPC 122(N) may process the data objects obtained from FPC 122(1). In this example, FPC 122(N) may identify any copies of data objects that belong and/or correspond to virtual forwarding plane 106(1) and then reject or delete them from virtual forwarding plane 106(N).

In some examples, FPC 122(1) may calculate the amount of memory consumed by those data objects that belong and/or correspond to virtual forwarding plane 106(1). In such examples, FPC 122(1) may notify routing engine 120 and/or virtual control plane 104 of the calculated amount of memory. In response, routing engine 120 and/or virtual control plane 104 may compute a memory limitation on the amount of memory allocated by virtual forwarding plane 106(2) to the applicable data objects.

In one example, this memory limitation may be computed by subtracting the amount of memory consumed by those data objects that belong and/or correspond to virtual forwarding plane 106(1). Routing engine 120 and/or virtual control plane 104 may direct the forwarding engine to limit the amount of heap memory in FPC 122(N) based at least in part on this memory limitation. The forwarding engine and/or FPC 122(N) may then apply the memory limitation such that the corresponding heap memory is allocated in accordance with the memory limitation.

Figure 4:
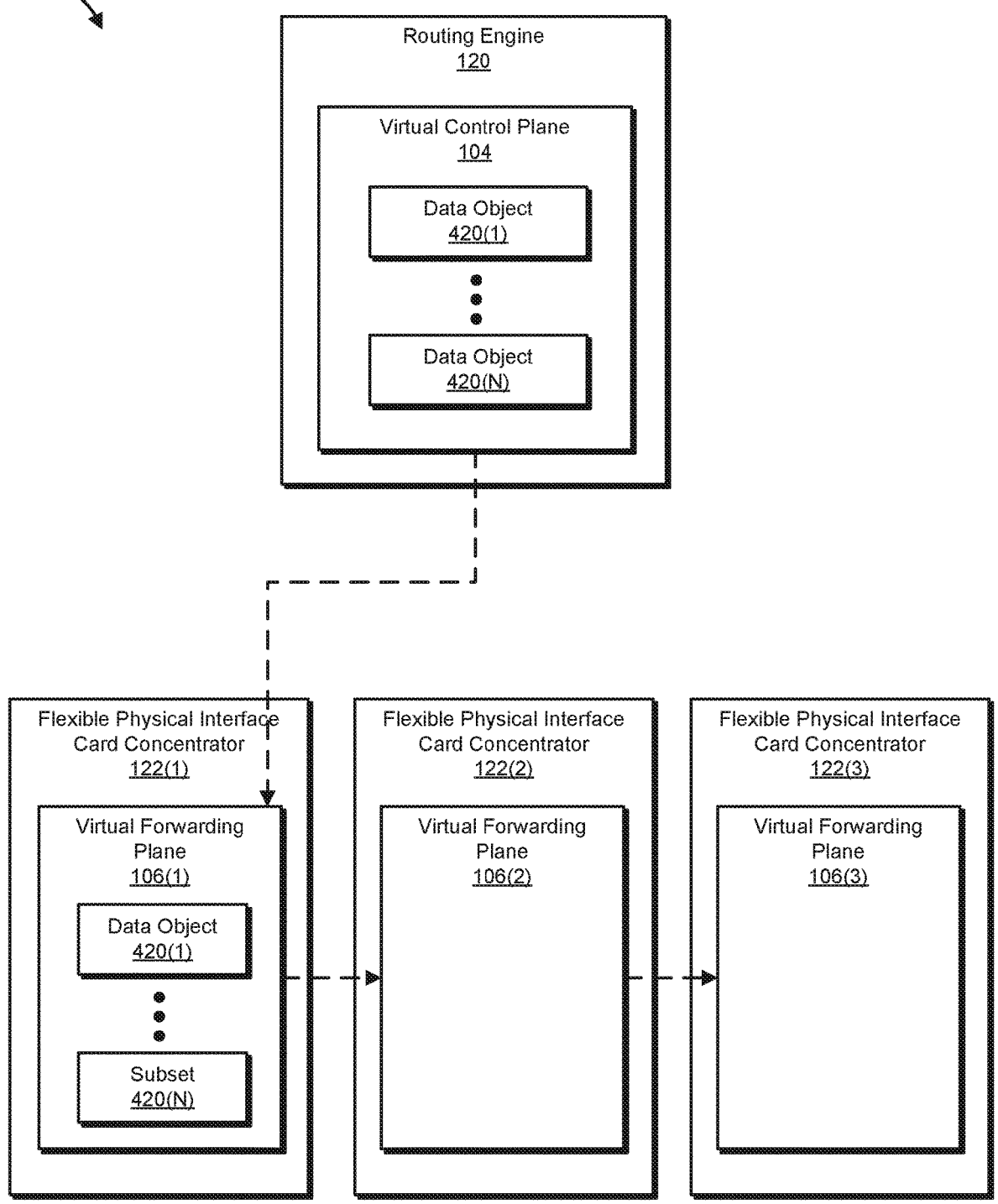
FIG. 4 is a block diagram of an exemplary implementation of an apparatus for improving convergence across virtual control and forwarding planes within network devices.

As a specific example illustrated in FIG. 4, routing engine 120 may deploy virtual control plane 104, which consists of and/or stores data objects 420(1)-(N). In this example, FPC 122(1) may deploy virtual forwarding plane 106(1). FPC 122(1) may obtain data objects 420(1)-(N) from virtual control plane 104 and then install the same in virtual forwarding plane 106(1). Some of data objects 420(1)-(N) may belong and/or apply to virtual forwarding plane 106(1) executed and/or deployed by FPC 122(1). Others of data objects 420(1)-(N) may belong and/or apply to virtual forwarding plane 106(2) executed and/or deployed by FPC 122(2) or virtual forwarding plane 106(3) executed and/or deployed by FPC 122(3).

Figure 5:
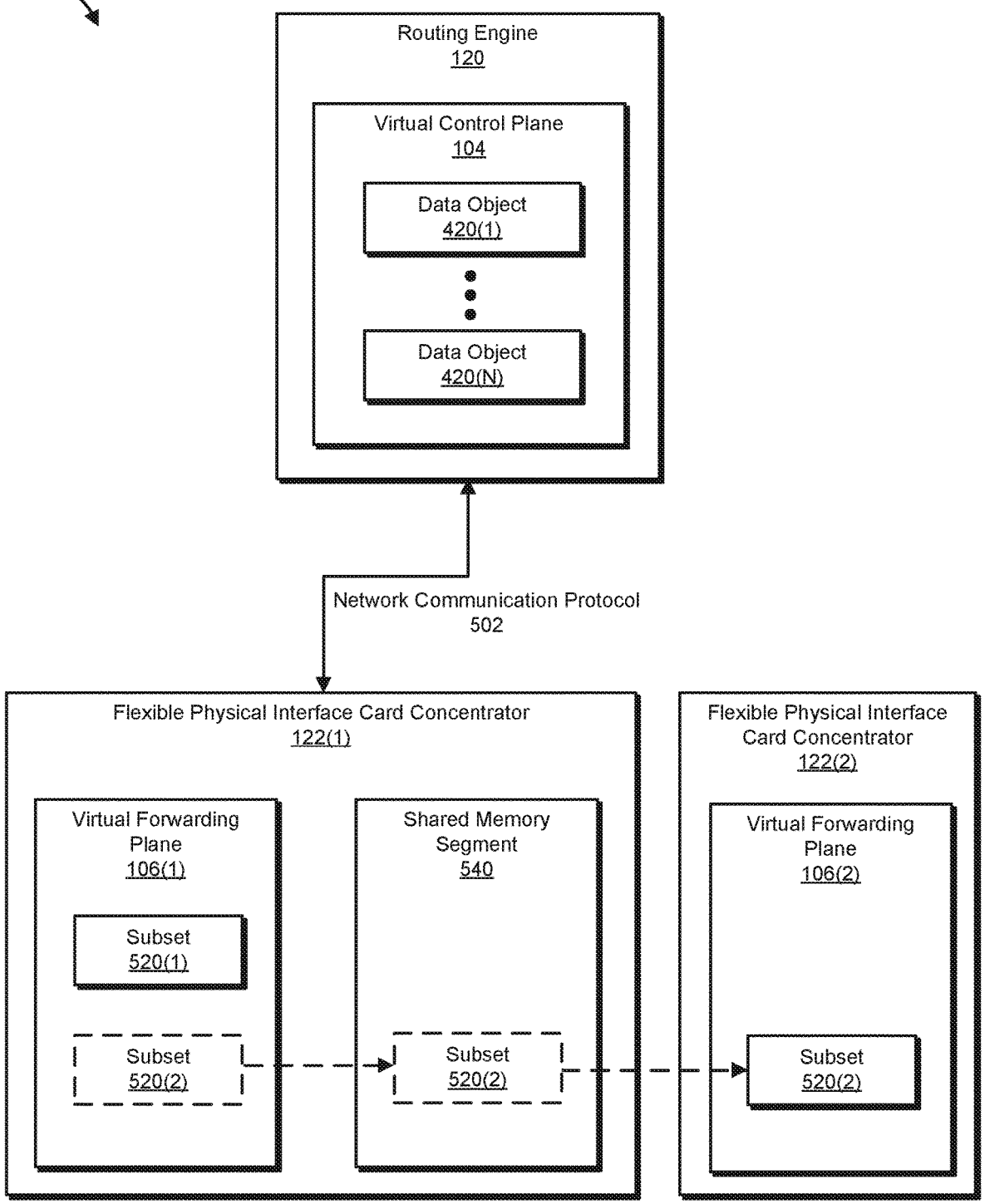
FIG. 5 is a block diagram of an exemplary implementation of an apparatus for improving convergence across virtual control and forwarding planes within network devices.

As another example illustrated in FIG. 5, FPC 122(1) may obtain data objects 420(1)-(N) from virtual control plane 104 via a network communication protocol 502 and then install the same in virtual forwarding plane 106(1). In one example, network communication protocol 502 may include and/or represent TCP/IP. Virtual forwarding plane 106(1) may process data objects 420(1)-(N). During this processing, virtual forwarding plane 106(1) may identify those data objects that belong and/or correspond to virtual forwarding plane 106(1). Virtual forwarding plane 106(1) may mark those data objects as part of subset 520(1).

In one example, the other data objects that do not belong to and/or correspond may be represented in FIG. 5 as part of subset 520(2). Virtual forwarding plane 106(1) may load and/or store subset 520(2) in a shared memory segment 540. In this example, shared memory segment 540 may include and/or represent a DRAM device that is accessible to virtual forwarding planes 106(1)-(N). Shared memory segment 540 may facilitate and/or provide faster access to the data objects included in subset 520(2) than network communication protocol 502. In other words, FPC 122(2) may obtain those data objects faster via shared memory segment 540 than via network communication protocol 502. Accordingly, virtual forwarding plane 106(2) may obtain subset 520(2) from shared memory segment 540.

In one example, virtual forwarding plane 106(2) may process the data objects included in subset 520(2). During this processing, virtual forwarding plane 106(2) may identify those data objects that belong and/or correspond to virtual forwarding plane 106(2). Virtual forwarding plane 106(2) may mark those data objects to indicate that they belong and/or correspond to virtual forwarding plane 106 (2).

In one example, virtual forwarding plane 106(2) may identify those data objects that do not belong and/or correspond to virtual forwarding plane 106(2). Such data objects may belong and/or correspond to neither virtual forwarding plane 106(1) nor virtual forwarding plane 106(2). In this example, virtual forwarding plane 106(2) may load and/or store those data objects in shared memory segment 540 of FPC 122(1) and/or another shared memory segment of FPC 122(2) (not explicitly labeled in FIG. 5). Accordingly, virtual forwarding plane 106(2) may obtain those data objects from shared memory segment 540 of FPC 122(1) and/or the other shared memory segment of FPC 122(2).

Figure 6:
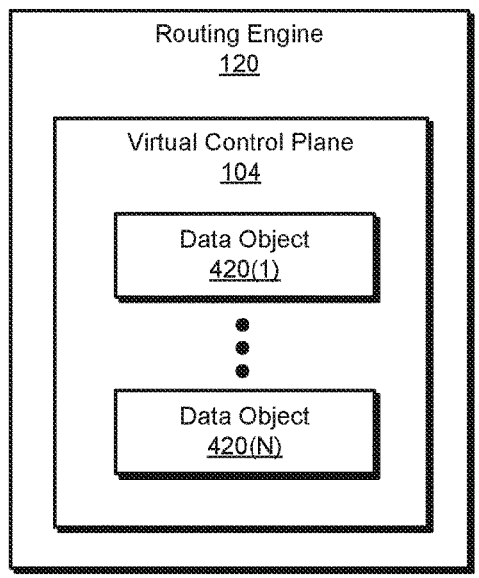
FIG. 6 is a block diagram of an exemplary implementation of an apparatus for improving convergence across virtual control and forwarding planes within network devices.
Figure 6:
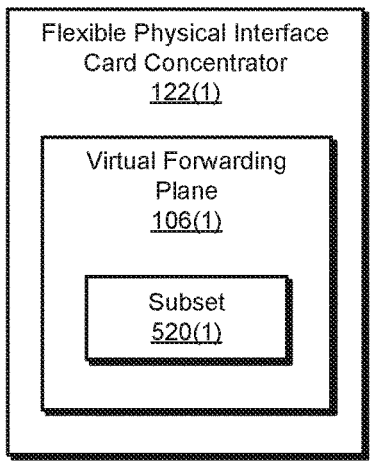
Figure 6:
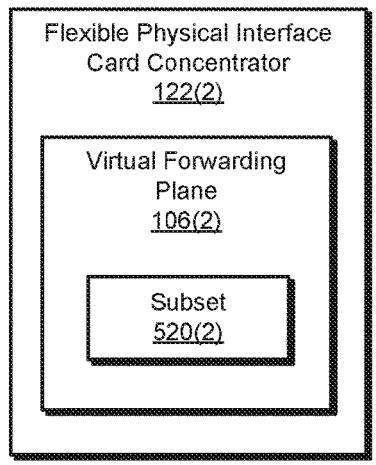
Figure 6:
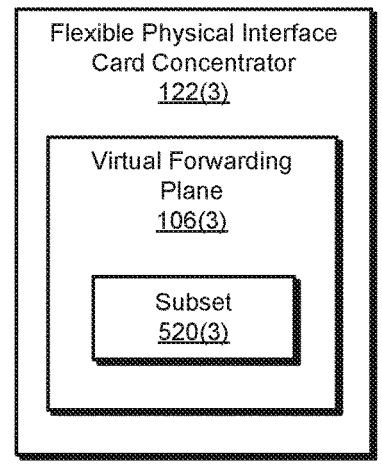

FIG. 6 illustrates an exemplary implementation of network device 202(1) in which routing engine 120 and virtual forwarding engines 122(1)-(3) have achieved convergence with one another. As illustrated in FIG. 6, virtual forwarding plane 106(1) may include and/or consist of subset 520(1) of data objects. In this example, virtual forwarding plane 106(2) may include and/or consist of subset 520(2) of data objects. Similarly, virtual forwarding plane 106(3) may include and/or consist of subset 520(3) of data objects. Each of subsets 520(1)-(3) may include and/or consist of certain data objects 420(1)-(N) copied from virtual control plane 104. In one example, the copies of data objects 420(1)-(N)

may each belong and/or correspond to only one of subsets 520(1)-(3). In other words, the copies of data objects 420 (1)-(N) included in subsets 520(1)-(3) may be exclusive to their corresponding subsets and/or removed or deleted from any inapplicable FPCs and/or virtual forwarding planes.

Accordingly, upon completion of convergence across virtual control plane 104 and virtual forwarding planes 106(1)-(3), some of data objects 420(1)-(N) may belong and/or apply to virtual forwarding plane 106(1) operating on FPC 122(1). Others of data objects 420(1)-(N) may belong and/or apply to virtual forwarding plane 106(2) operating on FPC 122(2) or virtual forwarding plane 106(3) operating on FPC 122(3).

In view of the convergence processes described above in connection with FIGS. 1-6, the apparatuses, systems, and methods disclosed herein may lead to various advantages over traditional technologies. For example, the shared DRAM segment(s) from which FPCs 122(2) and 122(3) obtain the data objects corresponding to virtual forwarding planes 106(2) and 106(3), respectively, may facilitate and/or provide faster access rates than TCP/IP. Since traditional technologies often involve all virtual forwarding planes obtaining data objects directly from the virtual control plane via TCP/IP, the embodiments disclosed herein may enable virtual control plane 104 and virtual forwarding planes 106(1)-(3) to converge with one another faster than those traditional technologies.

In addition, and as described above, FPCs 122(2) and 122(3) may obtain subsets of data objects 420(1)-(N) from FPC 122(1) for virtual forwarding planes 106(2) and 106(3), respectively. In some examples, those subsets obtained by FPCs 122(2) and 122(3) may be significantly smaller than the entire set of data objects 420(1)-(N) obtained by FPC 122(1). As a result, FPCs 122(2) and 122(3) may not necessitate the same size of heap memory as FPC 122(1). Accordingly, FPCs 122(2) and 122(3) may be able to perform their respective roles in the various embodiments disclosed herein with smaller heap memories than FPC 122(1), thereby potentially leading to lower memory costs when compared to traditional technologies. In fact, the heap memory of FPC 122(3) may be smaller than the heap memory of FPC 122(2), and the heap memory of FPC 122(2) may be smaller than the heap memory of FPC 122(1).

Moreover, and as described above, the subsets of data objects obtained by FPCs 122(2) and 122(3) may be smaller than the set of data objects obtained by FPC 122(1). In some of the embodiments disclosed herein, FPCs 122(1)-(3) may perform certain processing and/or analyses on the data objects installed and/or loaded into their corresponding virtual forwarding planes. Since the subsets of data objects installed and/or loaded into virtual forwarding planes 106(2) and 106(3), respectively, are typically smaller than the set of data objects installed and/or loaded into virtual forwarding plane 106(1), FPCs 122(2) and 122(3) may not necessitate the same amount of processing power as FPC 122(1). Accordingly, FPCs 122(2) and 122(3) may be able to perform their respective roles in the various embodiments disclosed herein with less powerful processors and/or ASICs than FPC 122(1), thereby potentially leading to lower processing costs when compared to traditional technologies. In fact, the processing power of FPC 122(3) may be lower than the processing power of FPC 122(2), and the processing power of FPC 122(2) may be lower than the processing power of FPC 122(1).

Figure 7:
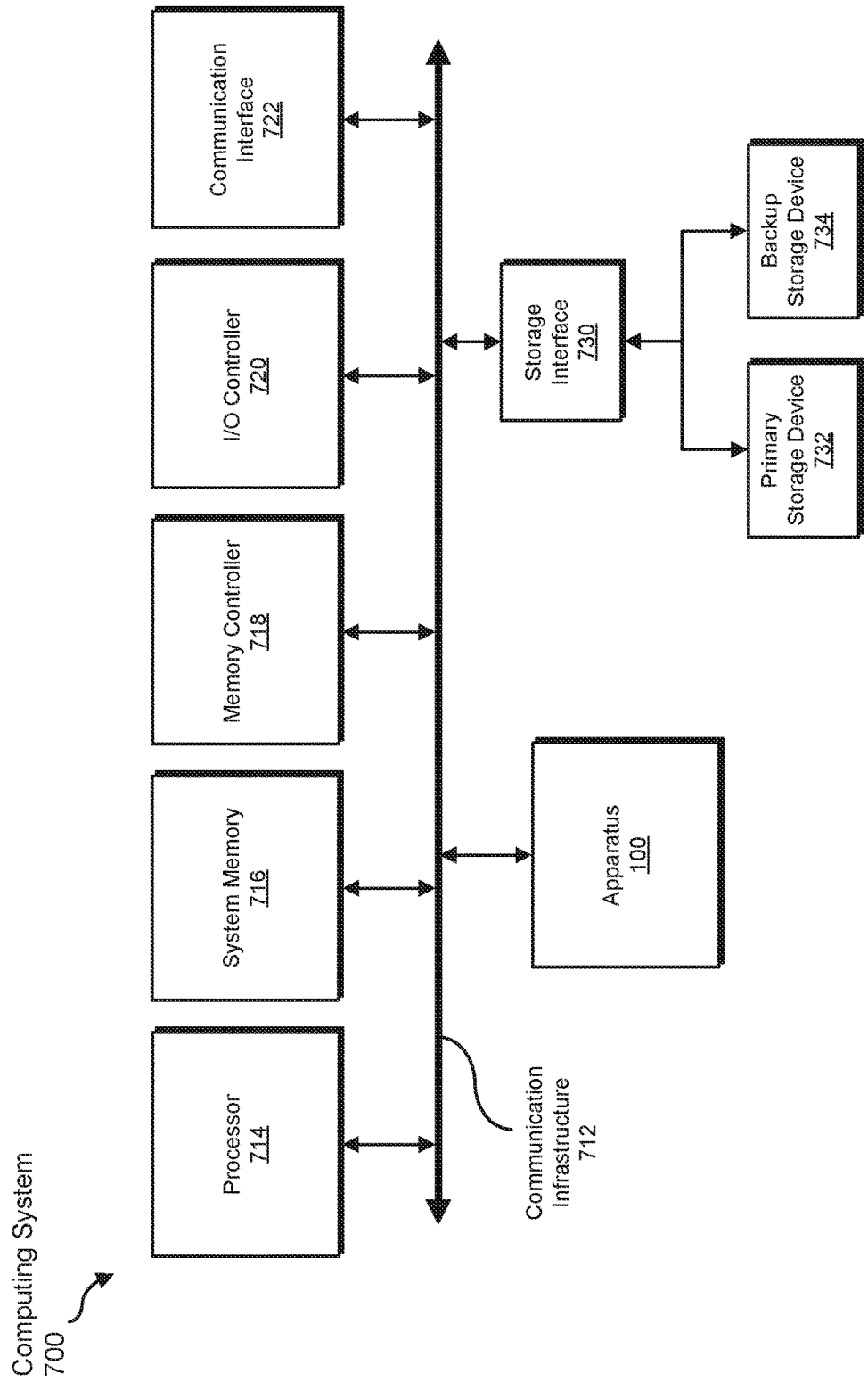
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include, represent, and/or implement exemplary apparatus 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general-purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a first virtual forwarding plane of a physical network device that connects to a virtual control plane of the physical network device;
   obtaining, by the first virtual forwarding plane, a set of data objects from the virtual control plane of the physical network device;
   identifying a second virtual forwarding plane of the physical network device that connects to the first virtual forwarding plane of the physical network device; and
   providing, by the first virtual forwarding plane, at least a portion of the set of data objects to the second virtual forwarding plane via a shared memory segment that is accessible to both the first virtual forwarding plane and the second virtual forwarding plane.

2. The method of claim 1, further comprising obtaining, by the second virtual forwarding plane, at least one data object that is excluded from the set of data objects from the virtual control plane via a network communication protocol.

3. The method of claim 1, further comprising:
   obtaining, by the second virtual forwarding plane, at least one data object included in the set of data objects from the virtual control plane via a network communication protocol;
   determining that the second virtual forwarding plane has already obtained the data object from the first virtual forwarding plane via the shared memory segment; and
   in response to the determination, dropping the data object from the second virtual forwarding plane.

4. The method of claim 1, further comprising:
   processing the set of data objects at the first virtual forwarding plane;
   during the processing of the set of data objects:
      identifying a first subset of the data objects as belonging to the first virtual forwarding plane; and
      marking the first subset of data objects to indicate which of the data objects belong to the first virtual forwarding plane; and
   wherein providing the portion of the set of data objects to the second virtual forwarding plane comprises:
      identifying a second subset of the data objects that do not belong to the first virtual forwarding plane; and
      providing the second subset of data objects to the second virtual forwarding plane via the shared memory segment.

5. The method of claim 4, wherein providing the second subset of data objects to the second virtual forwarding plane comprising rejecting, by the second virtual forwarding plane, any data objects marked as belonging to the first virtual forwarding plane.

6. The method of claim 4, further comprising:
   calculating an amount of memory consumed by the first set of data objects at the first virtual forwarding plane;
   computing a memory limitation that facilitates limiting an amount of memory allocated by the second virtual forwarding plane to the second subset of data objects by subtracting the amount of memory consumed by the first set of data objects from a total amount of heap memory for the first virtual forwarding plane; and
   applying the memory limitation to the second virtual forwarding plane.

7. The method of claim 1, further comprising:
   identifying a third virtual forwarding plane of the physical network device that connects to the second virtual forwarding plane of the physical network device; and
   providing, by the second virtual forwarding plane, at least some of the set of data objects to the third virtual forwarding plane via the shared memory segment.

8. The method of claim 7, further comprising:
   processing the portion of the set of data objects at the second virtual forwarding plane;
   during the processing of the portion of the set of data objects:

identifying a first subset of the data objects as belonging to the second virtual forwarding plane; and
marking the first subset of the data objects to indicate which of the data objects belong to the second virtual forwarding plane; and
wherein providing the at least some of the set of data objects to the third virtual forwarding plane comprises:
identifying a second subset of the data objects that do not belong to the second virtual forwarding plane; and
providing the second subset of data objects to the third virtual forwarding plane via the shared memory segment.

9. The method of claim 8, further comprising obtaining, by the third virtual forwarding plane, at least one data object that is excluded from the second subset of data objects from the virtual control plane.

10. The method of claim 9, further comprising:
obtaining, by the third virtual forwarding plane, at least one data object included in the second set of data objects from the virtual control plane;
determining that the second virtual forwarding plane has already obtained the data object from the second virtual forwarding plane via the shared memory segment; and
in response to the determination, dropping the data object from the third virtual forwarding plane.

11. The method of claim 8, further comprising:
calculating an amount of memory consumed by the first subset of data objects at the second virtual forwarding plane;
computing a memory limitation that facilitates limiting an amount of memory allocated by the third virtual forwarding plane to the second subset of data objects by subtracting the amount of memory consumed by the first set of data objects from a total amount of heap memory for the second virtual forwarding plane; and
applying the memory limitation to the third virtual forwarding plane.

12. The method of claim 1, wherein:
the first virtual forwarding plane operates on a first flexible physical interface card concentrator with:
a first amount of processing power; and
a first memory size; and
the second virtual forwarding plane operates on a second flexible physical interface card concentrator with:
a second amount of processing power that is less than the first amount of processing power; and
a second memory size that is smaller than the first memory size.

13. The method of claim 12, the shared memory segment comprises random-access memory included on the first flexible physical interface card concentrator.

14. An apparatus comprising:
a routing engine that:
deploys a virtual control plane of a network device; and
stores a set of data objects in connection with the virtual control plane;
a first flexible physical interface card concentrator that:
deploys a first portion of a virtual forwarding plane of the network device; and
obtains the set of data objects from the routing engine in connection with the virtual forwarding plane;
a second flexible physical interface card concentrator that:
deploys a second portion of the virtual forwarding plane of the network device; and
obtains, in connection with the virtual forwarding plane, at least a portion of the set of data objects from the first flexible physical interface card concentrator via a shared memory segment that is accessible to both the first flexible physical interface card concentrator and the second flexible physical interface card concentrator.

15. The apparatus of claim 14, wherein the second flexible physical interface card concentrator obtains, in connection with the second portion of the virtual forwarding plane, at least one data object that is excluded from the set of data objects from the virtual control plane.

16. The apparatus of claim 14, wherein the second flexible physical interface card concentrator:
obtains, in connection with the second portion of the virtual forwarding plane, at least one data object included in the set of data objects from the routing engine;
determines that the second portion of the virtual forwarding plane has already obtained the data object from the first flexible physical interface card concentrator via the shared memory segment; and
drops, in response to the determination, the data object from the second portion of the virtual forwarding plane.

17. The apparatus of claim 14, wherein:
the first flexible physical interface card concentrator:
processes the set of data objects;
during the processing of the set of data objects:
identifies a first subset of the data objects as belonging to the first portion of the virtual forwarding plane;
marks the first subset of data objects to indicate which of the data objects belong to the first portion of the virtual forwarding plane; and
identifies a second subset of the data objects that do not belong to the first portion of the virtual forwarding plane; and
provides the second subset of data objects to the second portion of the virtual forwarding plane via the shared memory segment.

18. The apparatus of claim 17, wherein the second flexible physical interface card concentrator rejects any data objects marked as belonging to the first portion of the virtual forwarding plane.

19. The apparatus of claim 17, wherein:
the first flexible physical interface card concentrator:
calculates an amount of memory consumed by the first set of data objects at the first portion of the virtual forwarding plane; and
notifies the routing engine of the amount of memory consumed by the first set of data objects at the first portion of the virtual forwarding plane; and
the routing engine:
computes a memory limitation that facilitates limiting an amount of memory allocated by the second portion of the virtual forwarding plane to the second subset of data objects by subtracting the amount of memory consumed by the first set of data objects from a total amount of heap memory for the first portion of the virtual forwarding plane; and
applies the memory limitation to the second portion of the virtual forwarding plane.

20. A network device comprising:
a routing engine that:
deploys a virtual control plane of the network device; and
stores a set of data objects in connection with the virtual control plane;

a first flexible physical interface card concentrator that:
  deploys a first portion of a virtual forwarding plane of the network device; and
  obtains the set of data objects from the routing engine in connection with the virtual forwarding plane;
a second flexible physical interface card concentrator that:
  deploys a second portion of the virtual forwarding plane of the network device; and
  obtains, in connection with the virtual forwarding plane, at least a portion of the set of data objects from the first flexible physical interface card concentrator via a shared memory segment that is accessible to both the first flexible physical interface card concentrator and the second flexible physical interface card concentrator.

* * * * *